(12) United States Patent
Nysæther

(10) Patent No.: US 12,447,392 B2
(45) Date of Patent: Oct. 21, 2025

(54) SKI POLE

(71) Applicant: Roar Skalstad, Kongsberg (NO)

(72) Inventor: Heine Liland Nysæther, Kongsberg (NO)

(73) Assignee: Roar Skalstad, Kongsberg (NO)

( * ) Notice: Subject to any disclaimer, the term of this patent is extended or adjusted under 35 U.S.C. 154(b) by 1207 days.

(21) Appl. No.: 16/489,380

(22) PCT Filed: Feb. 9, 2018

(86) PCT No.: PCT/NO2018/050037
§ 371 (c)(1),
(2) Date: Aug. 28, 2019

(87) PCT Pub. No.: WO2018/160069
PCT Pub. Date: Sep. 7, 2018

(65) Prior Publication Data
US 2019/0381389 A1    Dec. 19, 2019

(30) Foreign Application Priority Data
Mar. 2, 2017   (NO) .................................... 20170311

(51) Int. Cl.
*A63C 11/22*  (2006.01)
*B22D 25/02*  (2006.01)
*B33Y 80/00*  (2015.01)

(52) U.S. Cl.
CPC ............ *A63C 11/227* (2013.01); *B22D 25/02* (2013.01); *B33Y 80/00* (2014.12)

(58) Field of Classification Search
CPC ......... A63C 11/22; A63C 11/227; A63B 3/10; A63B 3/12; B22D 25/02; B33Y 80/00

USPC .......................................................... 280/819
See application file for complete search history.

(56) References Cited

U.S. PATENT DOCUMENTS

| | | | | |
|---|---|---|---|---|
| 4,106,777 A | * | 8/1978 | Kim ....................... | A63B 53/12 473/316 |
| 5,088,735 A | * | 2/1992 | Shigetoh ................ | A63B 53/10 473/320 |
| 5,139,283 A | * | 8/1992 | Dow ...................... | A63C 11/221 135/72 |
| 5,265,911 A | * | 11/1993 | Goode ................... | A63C 11/22 280/819 |
| 5,320,386 A | * | 6/1994 | Harmala ................ | A63C 11/22 280/819 |
| 5,437,450 A | * | 8/1995 | Akatsuka .............. | B29C 70/085 473/320 |
| 5,485,948 A | * | 1/1996 | McCrink .............. | B23K 1/0008 138/131 |

(Continued)

FOREIGN PATENT DOCUMENTS

JP            07155421       6/1995

OTHER PUBLICATIONS

Written Opinion issued in parent international application No. PCT/NO2018/05037, mailed Apr. 5, 2018, pp. 1-5.

(Continued)

*Primary Examiner* — Jeffrey J Restifo
(74) *Attorney, Agent, or Firm* — Jeffrey S. Melcher; Melcher Patent Law PLLC

(57) ABSTRACT

The invention relates to a ski pole where at least a part of the pole is in titanium and is formed as a lattice.

9 Claims, 1 Drawing Sheet

(56) References Cited

U.S. PATENT DOCUMENTS

| | | | | |
|---|---|---|---|---|
| 5,665,441 | A * | 9/1997 | Suzue | B32B 27/12 |
| | | | | 428/34.7 |
| 5,997,970 | A * | 12/1999 | You | A63D 15/08 |
| | | | | 428/36.2 |
| 6,088,947 | A * | 7/2000 | Suzue | A01K 87/00 |
| | | | | 43/18.1 R |
| 6,361,451 | B1 * | 3/2002 | Masters | A01K 87/00 |
| | | | | 473/318 |
| 6,520,867 | B1 * | 2/2003 | Miura | A63B 60/54 |
| | | | | 473/316 |
| 6,793,590 | B1 * | 9/2004 | Ho | A63B 53/10 |
| | | | | 473/320 |
| 6,805,642 | B2 * | 10/2004 | Meyer | A63B 60/00 |
| | | | | 473/320 |
| 6,860,821 | B2 * | 3/2005 | Unosawa | A63B 53/10 |
| | | | | 473/320 |
| 6,916,035 | B2 * | 7/2005 | Houser | A63B 60/08 |
| | | | | 280/602 |
| 8,800,578 | B2 * | 8/2014 | Jackson | A45B 3/00 |
| | | | | 135/66 |
| 9,849,349 | B1 * | 12/2017 | Westrum | A63B 53/02 |
| 10,335,259 | B2 * | 7/2019 | Frid | A61L 31/088 |
| 10,335,653 | B1 * | 7/2019 | Daraskavich | B23K 11/093 |
| 2005/0196570 | A1 * | 9/2005 | Lindsay | A63B 60/10 |
| | | | | 428/36.9 |
| 2008/0088112 | A1 * | 4/2008 | Lindsay | B29C 70/885 |
| | | | | 280/281.1 |

OTHER PUBLICATIONS

International Search Report issued in parent international application No. PCT/NO2018/05037, mailed Apr. 5, 2018, pp. 1-3.

* cited by examiner

SKI POLE

FIELD OF THE INVENTION

The present invention relates to a ski pole where at least some parts are made of titanium.

BACKGROUND OF THE INVENTION

Ski poles need to be light and have a high resistance against braking. Traditional ski poles where made of bamboo but modern ski poles are now mostly made in a composite material, especially in the more expensive segment. These are constructed as to have its highest strength in the longitudinal direction. But the nature of the carbon fibres makes them vulnerable to breaking when they are exposed to lateral forces. Ski poles have also been made from aluminium that is a light material but are more prone to bending.

Using a metal increases resistance against breakage as compared to carbon fibres. But to achieve an optimal weight it is important to use as little material as possible.

Titanium is a material that has high strength but low density. It has for example 60% higher density than aluminium and twice the strength. Titanium also exhibits high resistance against breaking.

U.S. Pat. No. 5 320 386 discloses a ski pole made of titanium with an additional material to increase its stiffness.

SUMMARY OF THE INVENTION

The object of the invention is to provide a ski pole that is as light as the present ski poles but is more resistant against breaking or buckling. This is achieved by making at least a part of the pole as a lattice or grid in titanium.

In one aspect of the invention the lattice is formed as a grid.

Preferably the length of the titanium part is between a third and a half of the length of the pole. Experience has shown that it is the lower part of the pole that is mostly in danger of breaking or buckling, either because of the high strain or because they get tangled in a competitors pole. Titanium is however a very expensive material and it is therefore preferable to use titanium only in the parts of the pole most prone to strain.

When the pole is not totally made in titanium it can be connected to the other part of the pole by glue or the other part can be threaded into the titanium part.

In one aspect of the invention the titanium part is cast.

In another aspect of the invention the titanium part is produced using 3D printing.

BRIEF DESCRIPTION OF THE DRAWINGS

The invention will now be described in more detail, referring to the enclosed drawings where.

DETAILED DESCRIPTION OF THE INVENTION

Figure 2:
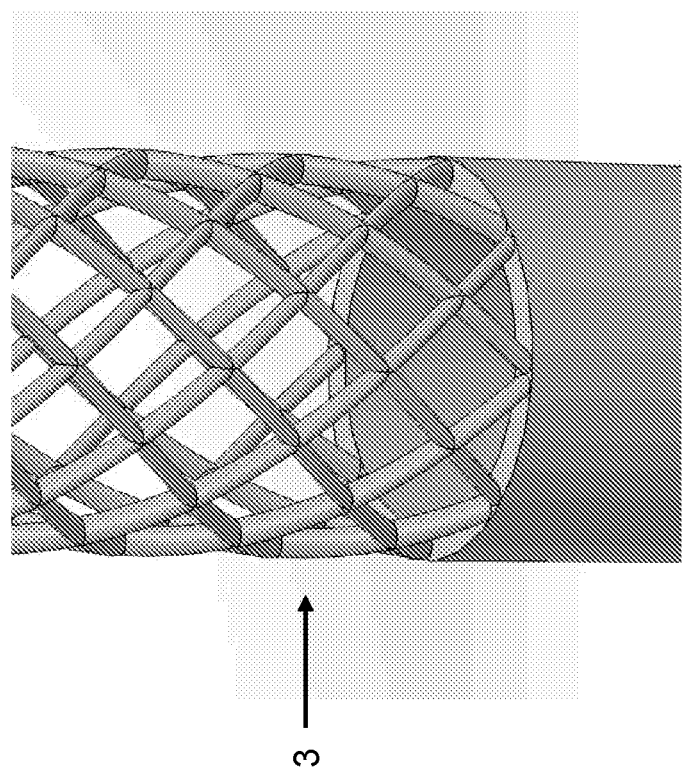
FIG. 2 shows the detail of titanium part.
Figure 1:
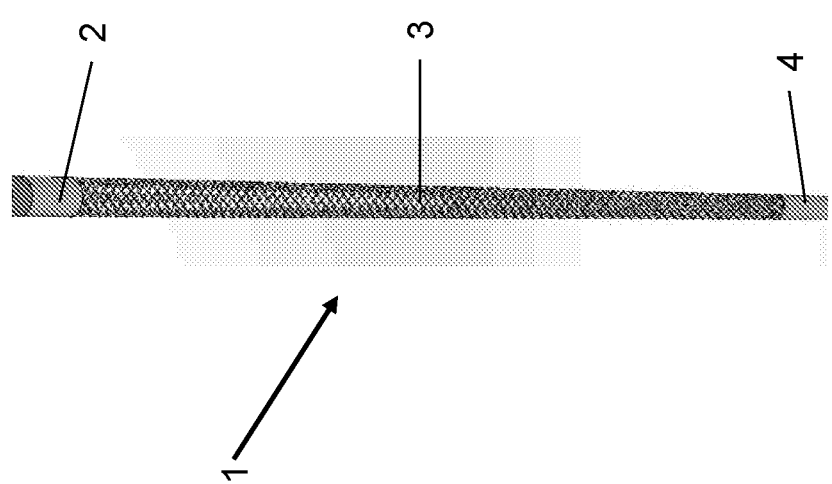
FIG. 1 shows a ski pole according to the invention.

In FIG. 1 there is shown a ski pole 1 comprising an upper part 2, a middle part 3 and a lower part 4. The middle part 3 is made of titanium and is formed as a lattice or grid as shown in FIG. 2. These enables good properties as regards to withstanding forces in three dimensions, especially when material weight is an important factor. As shown the titanium part is cylindrical but van also have other forms, for example hexagonal or octagonal.

The upper part of the pole may be a conventional material such as carbon fibres or aluminium. The part 2 is shaped so that it can fit with the titanium part 3 (not shown). A lower segment of the upper part can for example be cylindrical and with a diameter that enables it to fit into the titanium part 3 using glue or press fit. Other alternative attachment method known to those skilled in the art may also be used.

The lower part 4 is shaped with a point or similar to enable a good contact with the snow, as is well known in the art. The upper segment of the lower part 4 may, as for the upper segment, be cylindrical and in the same way pushed into or glued to the titanium part.

The titanium part may be manufactured using casting or 3D printing. It is of special note that the part is designed to be as resistant to buckling as possible.

The invention claimed is:
1. A ski pole comprising:
   a pole comprising an upper part, a middle part and a lower part, wherein the middle part comprising titanium formed as a lattice or grid, the upper part is formed of another material, and the lower part is configured to enable contact with snow.
2. The ski pole according to claim 1, wherein the middle part makes up between a third and the half of the length of the pole.
3. The ski pole according to claim 2, wherein the middle part is attached to the upper part using a press fit.
4. The ski pole according to claim 2, wherein the middle part is attached to the upper part with glue.
5. The ski pole according to claim 1, wherein the middle part is attached to the upper part using a press fit.
6. The ski pole according to claim 1, wherein the middle part is attached to the upper part with glue.
7. A method of making the ski pole according to claim 1 comprising forming the pole by 3D printing.
8. The ski pole according to claim 1, wherein the upper part is formed from carbon fiber or aluminum.
9. A method of making the ski pole according to claim 1 comprising forming the pole by casting.

* * * * *